Nov. 21, 1939.  G. L. C. EARLE  2,180,459
KITCHEN DEVICE
Filed Feb. 7, 1938  2 Sheets-Sheet 2

INVENTOR
GUYON L. C. EARLE
BY
ATTORNEY

Patented Nov. 21, 1939

2,180,459

UNITED STATES PATENT OFFICE 2,180,459

KITCHEN DEVICE

Guyon L. C. Earle, Forest Hills, N. Y.

Application February 7, 1938, Serial No. 189,036

11 Claims. (Cl. 126—37)

This invention relates to kitchen devices and more specifically to stoves and related structures.

In modern homes and apartments, kitchen space is necessarily very limited. In order to provide as much space as possible in the kitchen for walking, tables, chairs etc., it is necessary that the kitchen devices usually placed near the walls of the room, such as the sink and drainboard therefor, the stove, the refrigerator, the dishwasher, and the shelved cabinets, be arranged as compactly as possible without sacrifice of utility.

There is another requirement of modern kitchen devices that is next in importance to compactness, and that requirement is harmony of design. In most kitchen devices of the past, the stove is made as a separate unit, which is not in harmony with the rest of the kitchen ensemble. In the arrangement according to this invention, the stove is made in such a manner that it harmonizes perfectly with other articles of kitchen furniture (such as the refrigerator, sink and cabinets) to form a compact unit which has convenient and ample table space with a minimum of waste space. In one modification of the invention, the unsightly cooking space is hidden from view. Moreover, there is no space wasted between the wall cabinets and the table top, at the same time retaining ample working space on the table top.

It is, accordingly, an object of this invention to provide a stove unit of novel construction and arrangement.

It is another object of this invention to provide a kitchen cabinet structure in which the stove has such shape that it is adapted to harmonize wih a sink, refrigerator and shelved cabinets in such a manner that a unitary structure is formed.

It is a further object of this invention to provide a kitchen cabinet structure having a stove in which the upper portion thereof is set back from the bottom portion and a table-top member is placed on that part of the bottom portion not covered by the top portion, which table-top member may have an opening therein in which one or more heating members may be located.

Other objects of this invention, some of them more or less ancillary or incidental to those above mentioned, will appear hereinafter as the description proceeds.

In the preferred embodiment of the invention, a kitchen cabinet structure is provided which includes a stove unit, a sink unit and a refrigerator unit, there being a flat table-top member common to all three which is used, for example, in the preparation of food. The stove unit comprises a base or bottom portion containing a broiler, an oven, and one or more drawers for the accumulation of food or utensils, and a top portion which is located above and set back from the front of the bottom portion, this top portion containing one or more heated compartments each having a plurality of burners, which may be concealed from view, and a broiler burner, one or more flues for carrying away the heat from the heated compartments, a thermostatically controlled blower, and dampers for cutting off the flow of heated air into the flues as desired. The sink unit comprises a base or bottom portion containing the sink itself, the plumbing and cupboard space, and a top portion, which is located above and set back from the front of the bottom portion, containing a dish washing and drying compartment and shelves for canned food and supplies. The refrigerator unit likewise has a bottom portion and a set-back top portion. The three units have a common table-top member which has cut out thereof an opening for the sink and, if desired, space for a burner in the stove unit. The front surfaces of all three bottom portions are in a common vertical plane and the front surfaces of all three top portions are in a common second vertical plane which is set back from the first mentioned vertical plane. A false front extends the second vertical plane to the ceiling of the room containing the kitchen cabinet structure.

The invention will be more readily understood by referring to the following description and the accompanying drawings forming a part thereof, in which.

Figure 1:
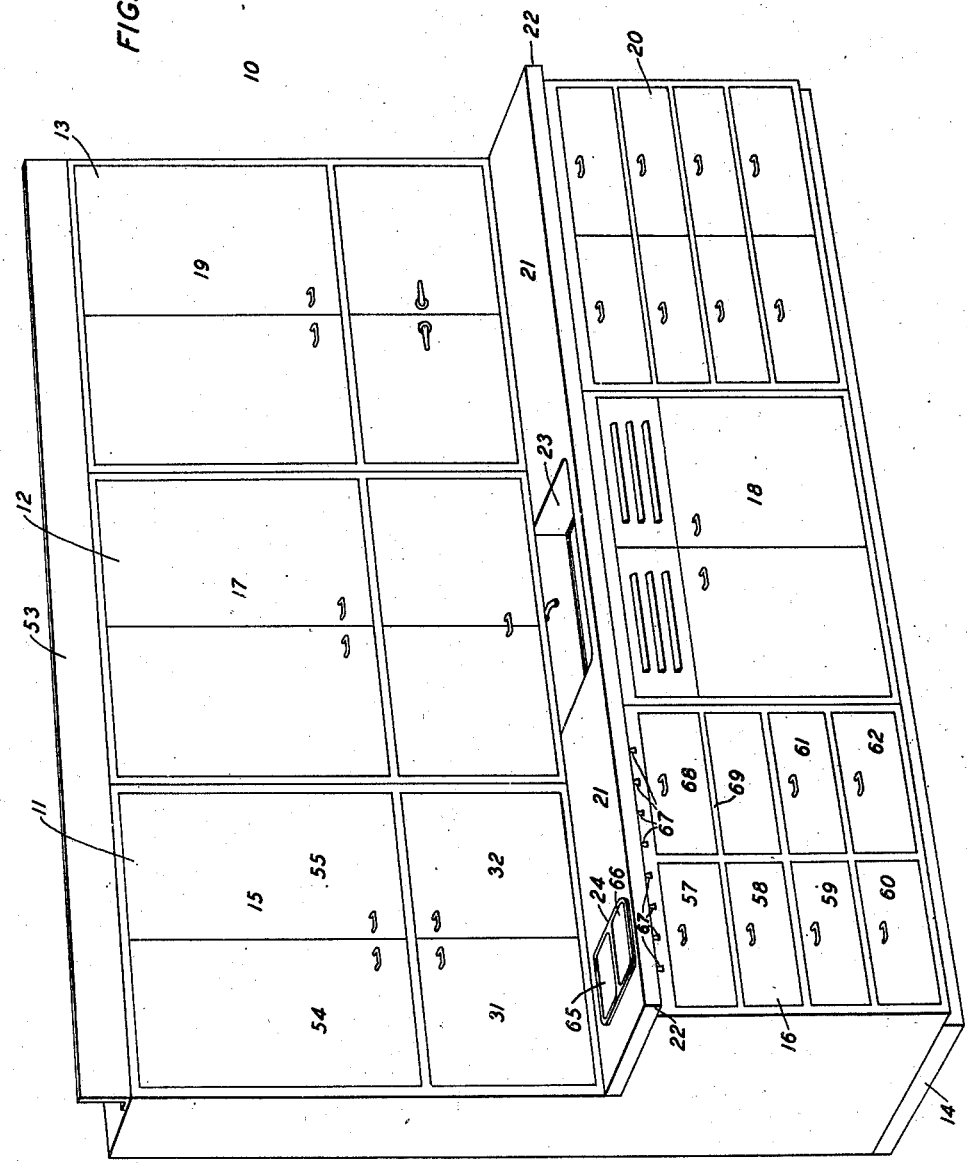
Fig. 1 is a perspective view of a preferred embodiment of the kitchen cabinet structure containing the stove unit of this invention.

Referring more particularly to the drawings, Fig. 1 shows, in perspective, a preferred form of the kitchen cabinet structure 10 containing the novel stove unit of this invention. The structure comprises three main units 11, 12 and 13 mounted on a wood or metal common base member 14 having its front edge set-in, if desired, to provide foot room. The unit 11 contains a stove or range, the unit 12 a sink, and the unit 13 a refrigerator, so these three units will hereinafter be referred to, respectively, as the stove unit, the sink unit and the refrigerator unit even though one or more of these units may also contain shelves or cabinet space.

The stove unit 11 comprises a top portion 15 and a bottom portion 16. Similarly, the sink unit 12 comprises a top portion 17 and a bottom portion 18, and the refrigerator unit includes a top portion 19 and a bottom portion 20. In the preferred embodiment, all three bottom portions of the units are covered with a common, flat, table member 21 which has an overhang 22 on the front surface of the structure, the member 21 having a cut-out portion for the sink 23 and, if desired, a cut-out portion for a platter 24 over a burner 170. It is to be understood, however, that it is within the scope of this invention to provide the member 21 in two or more pieces rather than in one piece as shown in the drawings. The member 21 may be of metal or of any suitable composition material.

Figure 2:
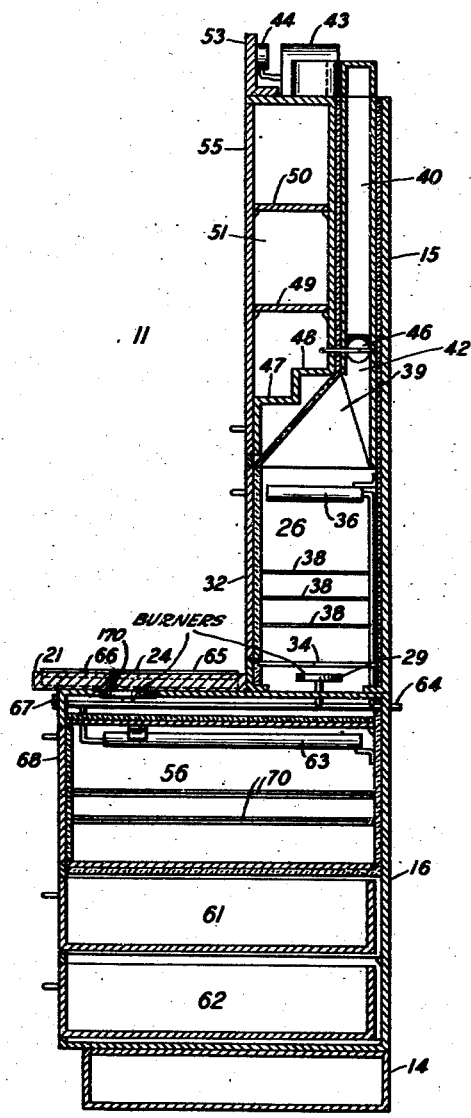
Fig. 2 is an elevation section of the stove or range unit.
Figure 3:
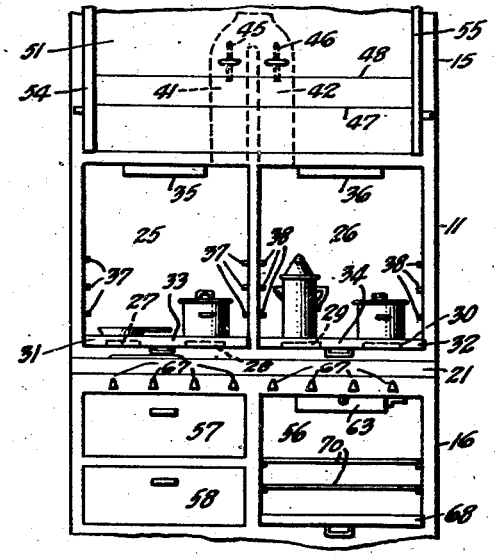
Fig. 3 is a front view of a portion of the stove or range unit.

Reference will now be made to Figs. 2 and 3 in addition to Fig. 1 for a detailed description of the stove unit 11. The upper portion 15 of the stove unit 11 comprises two or more heated compartments 25 and 26 having burners 27 and 28 and 29 and 30, respectively, located directly under the utensils shown in Fig. 5. Doors 31 and 32 hinged at the bottom swing down and out towards the table member 21, the inner surface of the doors being on a level with the grates 33 and 34 when the doors are in a horizontal position, thus making it possible to slide utensils off the grates to the inner surface of the doors 31 and 32 when they are open. At the top of the compartments 25 and 26 are preferably arranged burners 35 and 36 in order that the compartments may be used as broilers if desired. Mesh racks (not shown) may be held from guides 37 and 38 to support the food at the proper distance from the broiler burners. A hood 39 surmounts the compartments 25 and 26 to guide the heated air therefrom to a flue 40 through inlets 41 and 42. A blower 43 controlled by a thermostat 44 drives the heated air from the flue 40 to a main flue (not shown) of the house. In the inlets 41 and 42 are valves 45 and 46 to cut off the flow of heated air from one or more of the compartments 25 and 26 to the flue at will. In one method of operating the arrangement according to this invention, the article or articles of food may be heated, for example, in the compartment 26, by one or both of the burners 29 and 30, or by the top burner 36, and then the supply of heat is cut off, the valve 46 is turned to the "off" position, and the food allowed to continue its cooking in the compartment in the well-known "fireless cooker" manner. Preferably, by any suitable means, the valve 46 is so arranged that it can be turned to the "off" position only when the burners 29, 30 and 36 are "off". Similarly, the valve 45 is preferably so arranged that it is necessary to have the burners 27, 28 and 35 turned "off" before it can be placed in its "off" position.

Located above the compartments 25 and 26 are the shelves 47, 48, 49 and 50 for the storage of food, dishes or utensils. The shelf compartment 51 is completely heat insulated from the stove compartments 25 and 26 and from the flue 40 which passes through the shelf compartment. A false front 53 extends the vertical plane formed by the doors 31 and 32 of the stove compartments 25 and 26 and the doors 54 and 55 of the shelf compartment 51 to the ceiling of the apartment. The valves 45 and 46 are controlled through the shelf compartment 51. It will be noted from Fig. 2 of the drawings that shelves 47 and 48 are stepped to allow space for the hood 39.

The bottom portion 16 of the stove unit 11 comprises in its preferred embodiment, shown by way of example, a broiler compartment 56 and drawers 57, 58, 59, 60, 61 and 62 heat-insulated therefrom. At the top of the broiler compartment 56 is a heater element 63 which is shown connected to a gas pipe 64. The food being prepared may be placed on racks 70 which are mounted in any approved manner. It will be understood that while all the pipes, fixtures and connections for the gas circuit have not been shown in the drawings for the sake of clarity, any suitable arrangement of these members can be used. A platter 24 has been shown in full lines in Fig. 1 and in dotted lines in Fig. 2. This platter, which may not be present if it is desired to have an unbroken surface 21, has suitable surface pans or platters 65 and 66 for the frying of pancakes, eggs, toast, steaks, etc. on the top of the cabinet device, heat being supplied by a burner 170. The platter 24 is so hinged that it can be swung upward from its rear edge to expose a shallow tray for the broiling of steaks, chops, etc. Controls 67 for the burners 27, 28, 29, 30, 35, 36, 63 and the burner 170 are mounted in the upper part of the lower portion 16. These controls are preferably so arranged that they are almost, if not entirely, out of sight beneath the overhang 22 when the burners are not in use.

As a modification of the stove arrangement shown in these figures of the drawings, the heater element 63 may be located in the upper portion of the space occupied by the drawer 61 and the heat insulation placed around the drawer 61 and the compartment 56 instead of just around the broiler compartment 56. When these changes are made, the compartment 56 serves as an oven and the compartment 61 as a broiler compartment. By other obvious changes and additions the space occupied by the drawers 57 and 58 and possibly that occupied by the drawer 59 may be utilized as a broiler or as a broiler and oven, if desired. In order to present an even appearance with the drawers, the hinged door 68 may have a false division line or lines 69 as shown in the drawings. It will be obvious that it is within the scope of this invention to provide electric burners instead of gas, the latter being shown merely by way of example. It is also obvious that the entire bottom portion may be used for cabinet or shelf space, if desired in some cases.

It will be clear that there has been described above a stove arrangement which is suitable for a variety of purposes. The housewife can heat, broil, bake, boil or roast in either of the top heated compartments 25 and 26 or use each of these compartments as a "fireless" cooker. For baking, roasting or broiling larger articles the lower portion of the stove as, for example, the compartment 56 (used as a broiler as shown in the drawings or as an oven if the above-mentioned changes are made) may be utilized. For quick frying, the platter 24 mounted in the table portion 21 is ideal. The entire arrangement is so made that the stove unit looks more like a cabinet than anything else, and at the same time all of the vacant space usually found under the wall cabinets is now made use of.

All outside parts of the cabinet structure are preferably of metal although any other suitable material, such as a composition, may be used as well. The top 21 is preferably made of metal or composition. The cabinet structure of this invention makes use of all nooks and corners thus serving the dual purposes of providing more useful working space and preventing the accumulation of dust. The front surfaces of the tops of the three units are all in one vertical plane which plane is set back from another plane which contains the front surfaces of the bottoms of all three units.

Various modifications other than those described above may be made in the invention as above described without departing from the spirit or letter of this invention, the scope of which is indicated by the appended claims. For example, the various units may be in separated parts of the kitchen, if desired. In the claims the terms "first member" and "second member" are intended to be broad enough to cover the situation where the two members are so joined by a piece or pieces of material that they are actually one. Similarly the terms "burner" and "heating member" are intended to cover both electric and gas heating members.

What is claimed is:

1. In combination, a first member having an enclosed space therein, a second member having a smaller horizontal cross-sectional area than said first member, all portions of said second member being located above said first member, a stationary burner in the bottom portion of an enclosed space in the second member, a utensil supporting member associated with and closely adjacent said burner, a door for the enclosed space in said second member, and a handle for said door, said door being so arranged and mounted that when it is in the open position and its outside surface separated from the top of said first member by a distance which is substantially the depth of said handle its inside surface is at substantially the same level as the top of said utensil supporting member.

2. In combination, a first member having an enclosed space therein, and a second member having a smaller horizontal cross-sectional area than said first member, said second member being located above said first member and having a plurality of heating chambers located side by side therein, each of said chambers having a stationary heating member therefor, and a utensil supporting member at substantially the same level as the top of said first member associated with and adjacent said heating member.

3. In combination, a first member having an enclosed space therein, and a second member having a smaller horizontal cross-sectional area than said first member, said second member being located above said first member and having a plurality of heating chambers, located side by side therein, each of said chambers having a stationary heating member therefor, a utensil supporting member at substantially the same level as the top of said first member associated with and adjacent said heating member, and ventilating means for carrying off the heat from the chambers.

4. In combination, a first member having an enclosed space therein, a second member having a smaller horizontal cross-sectional area than said first member, said second member being located above said first member, a heating chamber in said second member, a heater member for said chamber, a utensil supporting surface associated with and adjacent said heater member, a second heater member in said chamber at a higher level than said first heater member, and a table-top member for said first member at substantially the same level as said utensil supporting member, said table-top member being so placed that it can be used while the burners are in operation.

5. In combination, a first member having a heating member therein, a second member having a smaller cross-sectional area than said first member, said second member being located above said first member and having a plurality of enclosed spaces therein, at least one stationary burner in each of said enclosed spaces in said second member, an upwardly extending hood for said plurality of enclosed spaces, a flue leading to each of said enclosed spaces and being attached to said hood, said flues merging into a larger flue, a valve in each of said smaller flues, a blower associated with said larger flue, and a table top member covering the portion of the top of said first member not covered by said second member.

6. In a stove device, a bottom enclosure member having a back wall, two side walls and a front wall, said front wall having at least one opening therein, a top enclosure member located above said bottom enclosure member and whose front wall is set back from the front wall of said bottom enclosure member, a stationary heater member for said top enclosure member, a utensil supporting member associated with and adjacent said heater member, and a table top member permanently mounted on the bottom enclosure member and in front of said top enclosure member, said utensil supporting member being at substantially the same level as the top of said table top member.

7. In combination, a first member having an enclosed space therein, a second member having a smaller horizontal cross-sectional area than said first member, said second member being located above said first member and having two heating chambers located side by side therein, a table top member permanently mounted on said first member and in front of said second member, a burner for each of said heating chambers, a utensil supporting surface for and adjacent each of said burners located at substantially the same level as said table top member, a vertical partition member between said heating chambers, and a burner in each of said heating chambers at a higher level than said first-mentioned burners.

8. In combination, a first member having an enclosed space therein, a second member having a smaller horizontal cross-sectional area than said first member, said second member being located above said first member and having two heating chambers located side by side therein, a table top member permanently mounted on said first member and in front of said second member, a burner for one of said heating chambers, a utensil supporting member associated with and adjacent said burner located at substantially the same level as said table top member, a vertical partition member between said heating chambers, a burner in the other of said heating chambers at a higher level than said first-mentioned burner, and a separate door for each heating chamber.

9. In a stove device, a bottom enclosure member having a back wall, two side walls and a front wall, said front wall having at least one opening therein, a top enclosure member located above said bottom enclosure member and whose front wall is set back from the front wall of said bottom enclosure member, said top enclosure member having two heating chambers located side by side and opening out on the front of said device, a separate downwardly swinging door for each heating chamber, a heating member for each heating chamber and a utensil supporting member for each chamber and adjacent said heating member therefor, said utensil supporting members being at substantially the same level as the inside surface of each of said doors when in the open position.

10. In a stove device, a bottom enclosure member, the front wall of which has at least one opening therein, a top enclosure member located above said bottom enclosure member and whose front wall is set back from the front wall of said bottom enclosure member, a stationary heater member for said top enclosure member, a utensil supporting member adjacent said heater member, a table top member permanently mounted on the bottom enclosure member and in front of said top enclosure member, the top of said table-top member being at substantially the same level as the utensil supporting member, and a stationary heating member in an opening in said table top member.

11. In a stove device, a bottom enclosure member the front wall of which has at least one opening therein, a top enclosure member located above said bottom enclosure member and whose front wall is set back from the front wall of said bottom enclosure member, said top enclosure member having two chambers located side by side therein, a stationary heater member for at least one of said chambers, a table top member permanently mounted on the bottom enclosure member and in front of the top enclosure member, and a stationary heating member in an opening in said table top member.

GUYON L. C. EARLE.